United States Patent [19]

Glittenberg et al.

[11] Patent Number: 4,810,517

[45] Date of Patent: Mar. 7, 1989

[54] DRY FOOD PRODUCT RECONSTITUTABLE WITH COLD OR HOT AQUEOUS LIQUIDS AND A PROCESS FOR MAKING SAME

[75] Inventors: Detlev Glittenberg, Weinsberg; Rolf Stute, Flein, both of Fed. Rep. of Germany

[73] Assignee: CPC International Inc., Englewood Cliffs, N.J.

[21] Appl. No.: 143,368

[22] Filed: Jan. 12, 1988

Related U.S. Application Data

[63] Continuation of Ser. No. 829,261, Feb. 14, 1986, abandoned.

[30] Foreign Application Priority Data

Feb. 23, 1985 [DE] Fed. Rep. of Germany ..... 35066513

[51] Int. Cl.$^4$ ............................................. A23L 1/195
[52] U.S. Cl. .................... 426/578; 426/579; 426/599; 426/634; 426/810; 426/658
[58] Field of Search ............... 426/589, 578, 579, 599, 426/634, 810, 658

[56] References Cited

U.S. PATENT DOCUMENTS

| | | | |
|---|---|---|---|
| 121,162 | 11/1871 | Picot | 426/589 |
| 625,880 | 5/1899 | Gere | 426/589 |
| 1,001,044 | 8/1911 | Kellogg | 426/589 |
| 1,071,312 | 8/1913 | Greco | 426/589 |
| 2,363,193 | 11/1944 | Moore | 426/589 |
| 2,391,829 | 12/1945 | Huber | 426/589 |
| 3,197,312 | 7/1965 | Eolkin | 426/589 |
| 3,752,677 | 8/1973 | Andrews | 426/589 |
| 4,233,322 | 11/1980 | Fritze | 426/589 |
| 4,465,696 | 8/1984 | Strahl | 426/589 |

*Primary Examiner*—Jeanette Hunter

[57] ABSTRACT

A dry food product which is reconstitutable with aqueous liquids to form a pulpy textured sauce, soup, juice, compote or concassee, and a process for its preparation. The dry food product consists of combining a leguminous pre-gelatinized cold swelling starch component, with dry fruit, vegetable, fungus or root substances flavoring.

20 Claims, No Drawings ly process, as taught in U.S. Pat. No. 4,031,266. This solution is only moderately successful, however.

DRY FOOD PRODUCT RECONSTITUTABLE WITH COLD OR HOT AQUEOUS LIQUIDS AND A PROCESS FOR MAKING SAME

This is a continuation, of application Ser. No. 829,261, filed Feb. 14, 1986, abandoned.

FIELD OF THE INVENTION

The invention relates to a dry food product reconstitutable with cold or hot aqueous liquids, and a process for making same, which forms a sauce, soup, juice, compote or concassee with a pulpy structure. The dry food product contains starch, having a leguminous pre-gelatinized starch component, and, optionally, other consistency or structure-imparting ingredients, in addition to at least one taste or flavor-imparting component based upon a dry fruit, vegetable, root or fungus substance.

BACKGROUND OF THE INVENTION

Reconstitutable dry products of the type mentioned above, have been known for many years. In terms of organoleptic properties, in particular taste, such products have satisfactory quality and differ only slightly from those of home-made soups or sauces which are prepared from fresh raw ingredients. However, preparations made from these known dry products generally have a smooth, homogeneous structure. This texture is frequently desirable since the chef, in preparing this kind of soup or sauce from fresh raw ingredients, intends to obtain a smooth, creamy consistency, which is essentially based upon the starch content.

Starches useful for this purpose include native starches, i.e., starches which have been isolated from the plant, are present in pure form and which require a heating step to gelatinize them. These "swelling starches" are therefore pre-gelatinized, cold-swelling starches and may be produced in different ways. The most common method used to produce cold swelling starch is the roll-drying process in which the starch is pre-gelatinized and dried on the roll simultaneously, or pre-gelatinized first in a separate step and then subjected to roll-drying.

In certain cases, however, when preparing home-made tomato sauce, apple sauce, apple compote or "potages", the chef wants to produce a pulpy texture or structure which is an essential organoleptic quality generally absent from soups or sauces prepared from dry products. Experts, aware of this problem, have tried to develop different dry products which, in combination with aqueous liquids, will produce juices, sauces, or soups with a pulpy structure resembling that of finely pureed fruits or vegetables, such as "tomato concassee". However, a completely satisfactory solution has not yet been found.

One attempt to solve this problem is to add to the non-starch components of this type of dry product a gelatinized, cross-linked and/or high-amylose powdered starch product, and to heat this mixture to at least 72° C. to cause the starch particles to swell as disclosed in U.S. Pat. Nos. 3,443,964, 3,579,341 and 3,650,770. Another solution which produces a dry product for preparing tomato drinks is to subject an aqueous mixture of tomato solids and gelatinizable starch materials, having a starch to water ratio selected to allow for partial gelatinization of the starch grains, to a roll drying process, as taught in U.S. Pat. No. 4,031,266. This solution is only moderately successful, however.

The only satisfactory solution to this problem is based upon the use, as a component of the starch portion, of a so-called "starch sponge" in which the fruit or vegetable substance is impregnated or incorporated into the starch matrix during production of the sponge, as in German Pat. No. 2,938,596. Upon reconstitution with hot aqueous liquids, these dry products yield sauces, soups, juices or compotes having an excellent pulpy structure, thereby solving the texture problem. However, starch sponges have the following disadvantages:

(a) the production of the starch sponge is time-consuming and comparatively expensive;

(b) the cooking stability of the starch sponge is limited in that, after prolonged cooking, it slowly changes back to a normal starch paste so that the initial pulpy texture gradually becomes weaker and eventually disappears, and (c) the reconstitution with cold aqueous liquids frequently is slow and incomplete.

In conclusion, based upon the prior art, there appears to be a demand for a dry food product which can be reconstituted to form a pulpy textured fruit or vegetable juice, soup or sauce with cold swelling properties. Further, the product should remain stable upon exposure to prolonged heating conditions, such as in boiling, pasteurizing or sterilizing. It should also have the ability to be quickly reconstituted in cold or hot aqueous liquids. The process used to prepare this product should be cost effective. The present invention satisfies these requirements as described hereinbelow.

SUMMARY OF THE INVENTION

It is the object of this invention, therefore, to provide dry food products containing pre-gelatinized starches derived from legumes such as peas, beans and lentils which may be partially in the form of a starch sponge. The soups, sauces, and compotes prepared from the product of the invention have a pulpy structure or texture which even experts have difficulty distinguishing from the structure or texture of home-made foods prepared from fresh vegetables or fruit. Moreover, the food products prepared from the instant product are superior to home-made foods with respect to texture stability after cooking and upon reconstitution in cold or hot aqueous liquids. The process for producing such dry food products is also less costly than production of products based, for example, on the starch sponge.

The invention is based upon the use of leguminous pre-gelatinized starches which are obtained by drying a leguminous starch gelatinized under "mild" conditions, e.g., by roll-drying a suspension of a native leguminous starch. Such leguminous starches will rehydrate in aqueous liquids to form a pulpy textured paste with a concassee-like structure, not a smooth starch sol or gel as would be expected from known starches. A further refinement of the instant product is that reconstitution in cold aqueous liquids occurs faster and more completely than with starch sponges, and the texture of the product is more stable during cooking than that of known starch sponges.

Gelatinization under "mild" conditions, as mentioned above, is meant to denote conditions which resemble those commonly present in roll-drying, in which highly concentrated aqueous starch dispersions are gelatinized under essentially thermal conditions, without exposure to any major shear forces, at temperatures which do not substantially exceed 100° C. during gelatinization, and are then dried on steam-heated rolls.

DETAILED DESCRIPTION OF THE INVENTION

The leguminous pre-gelatinized starches which are used according to the invention, at least partially, as starch components, rehydrate readily in aqueous media. In the presence of finely dispersed fruit substances, for example, (even at room temperature), the leguminous starches of the invention yield a product which, in term of organoleptic properties, in particular texture, closely resembles a concassee of fruit pulp which does not lose this texture even after prolonged cooking. Even though these starches are present in relatively small amounts, they impart the desired pulpy texture to the finished product.

Thus, in the simplest case it is sufficient to replace part of the starch component normally present as a thickener in known dry products, with leguminous pregelatinized starch. For this purpose, prepared leguminous pre-gelatinized starch may be added to the remaining product components or, preferably, leguminous starch "in situ" may be converted to leguminous pre-gelatinized starch. The degree of fineness and extent of texturing may be varied within wide limits by an appropriate choice of particle size and amount of leguminous starch to be used. The parameters to be considered in determining the starch to be used are that the fineness of texture is proportional to the particle size, and the extent of texturing increases with the particle size, while the amount of leguminous pre-gelatinized starch remains constant.

Further, a particular texture may also be achieved by adding, as a fruit substance, fruit pulp of an appropriate grain size which has been dried by freeze-drying or another structure-preserving process. However, this product component, which may optionally be used for the instant invention, is not only relatively expensive, but even if the entire amount of fruit substance is added in this form, will not, by itself, have a texturing effect as pronounced as that of the leguminous pre-gelatinized starch product of the invention.

As stated, a distinct texturing effect may be achieved by adding only a portion of the starch component in the form of leguminous pre-gelatinized starch. The remainder of the starch may then be added in the form of a combination of "ordinary" pre-gelatinized starch, native starch, or, preferably, starch sponge. It should be noted here that the obviously superior rehydrating properties of the leguminous pre-gelatinized starch product in cold aqueous liquids and the greater degree of cooking stability of this starch product, compared to other types of starch sponges, are also characteristic of leguminous starch sponges. Accordingly, for the purposes of the invention, the leguminous pre-gelatinized starch may be wholly or partially in the form of a leguminous starch sponge.

Leguminous starches with amylose contents of 50 percent or more by weight, when used for the purposes of the invention, do not present any problems, but they do not have any advantages over leguminous starches with lower amylose contents. Therefore, leguminous pre-gelatinized starches with an amylose content of at most 50 per cent by weight are preferred according to the invention.

The proportionate amount of leguminous pregelatinized starch to be used to the total content of added starch is at least 50, preferably at least 70, and most preferably, at least 85 w/w % leguminous pre-gelatinized starch. However, if the remaining starch component consists of starch sponge which yields a pulpy texture, or if the dry product contains other commonly known components which impart a pulpy texture, then the amount of pre-gelatinized starch to be used may be lower.

The most economical and reliable method of producing leguminous pre-gelatinized starches suitable for the purposes of the invention is by roll-drying preferably granular dispersions of leguminous starches. Dry food products having a content of leguminous pre-gelatinized starch consisting predominantly (preferably more than 70 and most preferably, at least 85 w/w %) of pre-gelatinized starch obtained by roll-drying an aqueous dispersion of granular leguminous starches are preferred.

It should be pointed out that the reconstituting properties of the leguminous pre-gelatinized starches of the invention may be further improved by conditioning. This step consists of heat treatment of the leguminous pre-gelatinized starch after drying. Optimum conditions for this heat treatment are easily determined based upon the requirements of the final starch product. When producing leguminous pre-gelatinized starches by roll-drying, the conditioning step is preferably carried out immediately after the roll-drying process.

The total content of starch present in the dry food products of the invention suitably ranges from about 2–70, more preferably, from about 3.5–50 and most preferably from about 5–25 w/w % based on the total weight. Clearly preferences are determined within this range depending upon the type of product desired.

The texture-forming properties of such leguminous pre-gelatinized starches of the invention depend, inter alia, upon the particle size which is selected. A suitable particle size range is from about 0.1–10, more preferably from about 0.15–8, and most preferably from about 0.2–6 mm. Based upon these ranges, the (generally flaked) starch particles pass through a sieve having openings of the appropriate width (upper value) and are retained on such sieve (lower value) respectively.

When fruit is used, the fruit component of the dry food product may, as stated, be present in fruit powder form. However, it is advantageous to add only a portion of the fruit substance in powdered form and/or a portion in the form of freeze-dried fruit pulp. It is also preferable to add at least a portion of the fruit substance by sorptively binding or incorporating the fruit in the starch matrix in the form of a compound starch sponge (German Pat. No. 2,938,596).

For purposes of the invention, additional consistency or structure-imparting components and additives may be combined with the leguminous starch and the flavoring agent (fruit, vegetable, etc.), depending upon the textural properties desired in the dry product. Filling and thickening agents may also be used to achieve desired consistency and structural qualities in the dry food product. The particular consistency, structure-imparting components and filling and thickening agents to be used for this purpose are known to those skilled in the art.

Starches suitable for the purposes of the invention are not only starches per se, but also starch materials which are known to be equivalent to those starches when used in home-cooking, for example, flours which contain a high starch content.

Any type of leguminous starch may be used for the invention described herein. However, leguminous pre-gelatinized starches derived from *Phaseolus vulgaris, Phaseolus mungo* (radiatus, *Vigna radiata*), *Phaseolus crysantus, Phaseolus aconitifolius, Phaseolus lunatis, Dolichos lablab, Dolichos biflorus, Vivia faba* L, *Psophocarpus tetragonoglobus, Cicer arietum, Cajanus cajan, Vigna unguiculata* (sinensis), *Pisum sativum* L. and/or *Lens culinaris* are particularly well suited for the invention.

As described hereinabove, in its simplest embodiment, the invention requires the addition to the dry product of leguminous pre-gelatinized starch having the appropriate particle size. However, according to the invention, it is preferable to use "compound" leguminous pre-gelatinized starches, which are leguminous pre-gelatinized starches into which one or more food components, preferably, fruit, vegetable, root or fungus substances, have been incorporated. These compound starches are formed by impregnating the leguminous pre-gelatinized starch with a solution or dispersion of food components or preferably, by roll-drying an aqueous mixture of mildly gelatinized, leguminous starch and the food component to be incorporated into it. It is preferable for this invention to use dry food products which contain at least 5, preferably at least 20, and most preferably, 50 w/w % of fruit substances in the form of compound leguminous pre-gelatinized starch and, optionally, a compound starch sponge. Compound leguminous pre-gelatinized starches which contain from about 10–95, preferably from about 25–80, and most preferably, from about 35–65 w/w % of starch are particularly suitable for the invention.

With reference to the type of food substance which is preferred to be incorporated into the dry food product of the invention, those which contain, for example, tomato, apple, orange, pear, apricot, raspberry, blackberry, red currant, carrot, horseradish, mushroom, celery root, leek, cauliflower, spinach, among many others, may be used. Further, flavoring agents may also be used separately or in combination with the food substances.

In summary, the product of the invention which comprises leguminous, pre-gelatinized starch has the following advantages:

1. Leguminous pre-gelatinized starches have a neutral taste which is advantageous especially when they are combined with, for example, fruit substances which have a delicate and easily suppressed flavor.
2. The fat content of leguminous starches is very low which ensures good storage stability. This low fat content also renders the addition of stabilizers, such as phosphates during roll-drying unnecessary. (The addition of such stabilizers would otherwise be required with high-lipid cereal starches or flours to prevent rancidity.)
3. The use of leguminous pre-gelatinized starches resolves texturing problems found in the prior art. By using the instant process, it is possible to combine chemically cross-linked starches with limited swelling properties (U.S. Pat. Nos. 3,443,964 and 3,579,341), with additives such as microcrystalline cellulose. An additional advantage of the invention is that if additives, flours or other starches are desired for specific applications, no major process modifications would be required and the resulting product would be of high quality.
4. Leguminous pre-gelatinized starches of the invention, and the dry food products based thereon, provide dramatic swelling properties in cold aqueous liquids. Thus, the starch product of the invention requires no heating, which would otherwise be required with starch sponges to rehydrate the starch product smoothly and rapidly. The leguminous pre-gelatinized starches of the invention thus exhibit the same swelling characteristics in cold water as ordinary pre-gelatinized starches and may also, of course, be reconstituted in hot aqueous liquids.
5. The ability of the leguminous pre-gelatinized starches to develop a pulpy texture on rehydration is increased by a known conditioning step, which consists of heat treatment with the starch containing an appropriate water content. This heat treatment may advantageously be conducted subsequent to the roll-drying process, provided the roll-drying step is conducted with the same water content in the starch when the film is removed from the roll, as that required for the conditioning step.
6. Using the leguminous starches of the invention, it is possible to obtain products with a uniform appearance even when high proportions of starches are used. Unlike most known processes, this invention provides for separate production of compound leguminous pre-gelatinized starches, especially by roll-drying the starch in combination with other food components, such as fruit or vegetable substances. Therefore, the products obtained from these starches can exhibit a uniform appearance, if that is desired.
7. To obtain a pulpy structure, the leguminous pre-gelatinized starches need not contain higher than a 50% amylose content. According to the instant process as illustrated by the examples hereinbelow, an amylose content of 40% or less is sufficient to obtain the desirable pulpy texture.

It is known that pulpy textured systems can be properly described by sensory factors, based upon inherently subjective parameters (appearance, mouthfeel, etc.). The examples and comparison tests which follow, however, and which illustrate the invention and its advantages, specify in addition to the usual parameters such as particle size distribution (which should preferably range from about 1–4 mm) and particle form (which should be largely uniformly three-dimensional), the following objective parameters which characterize pulpy textured products:

1. Cooking residue

At a given particle size distribution, the cooking residue of thereconstituted dry product provides a measure of the stability of the pulpy texture under standardized cooking conditions. It is determined as follows:

15 grams of the product are cooked in 500 milliliters of water for a specific time period (2 and 10 minutes respectively). The cooked product is then poured through a 500 micron sieve. The sieve residue is weighed and marked in grams as "cooking residue".

2. Sediment

The sediment provides a measure of the water-absorptive capacity or swelling properties of the particular pulpy textured system. It is determined as follows:

20 grams of the instant dry product are heated in 250 milliliters of water, boiled and subsequently centrifuged for 3 minutes at 1,400–4,000 G. The clear phase is then separated and the moist sediment weighed. The sediment weight is given in percent based upon the total weight of the sample.

3. Cold residue

The cold residue reflects the water-absorptive capacity or the cold swelling characteristics after 5 minutes of hydration with tap water. It is determined as follows:

15 grams of the instant dry product are allowed to swell in 500 milliliters of cold water (at room temperature) for 5 minutes. The sample is then poured through a 500 micron sieve. The sieve residue is weighed and marked in grams as "cold residue".

EXAMPLE 1

An aqueous slurry consisting of 1.65 kilograms of starch derived from smooth peas (amylose content about 34 w/w %) in 3.35 kilograms of water was dried with a paired roll dryer at a heating steam pressure of 2-5 bars and a speed of rotation of 1-3 revolutions per minute (corresponding to a film residence time of 10-30 seconds).

The dried film was crushed and pressed through a sieve having openings of a width of 4 millimeters. The resulting leguminous pre-gelatinized starch was present in the form of "flakes".

A mixture was prepared consisting of leguminous pre-gelatinized starch "flakes" and tomato powder in a ratio of 1:1 in the cold or hot state (e.g., 20 grams in 200 milliliters of water). This mixture resulted in a ready-to-eat product (tomato sauce) having the desired pulpy texture.

Even after reconstitution under sterilizing conditions (45 minutes at 121° C.) the resulting product (80 grams of product reconstitutable with one liter of water) retained a highly viscous pulpy structure.

EXAMPLE 2

A mixture consisting of 1.5 kilograms of starch derived from smooth peas, 4.1 kilograms of tomato pulp (36° Brix corresponding to 1.467 kilograms dry substance), 2.2 kilograms of water and 50 grams of citric acid was roll-dried and crushed under the conditions described in Example 1.

By reconstituting 20 grams of the resulting dry product with 200 milliliters of boiling water, a ready-to-eat product having a desirable pulpy texture was obtained. This product, which was reconstituted in the same manner as the dry product (mixture) of Example 1, had a much more homogeneous appearance than that obtained in Example 1.

To determine whether the excellent quality of the product of Example 2 was due to the use of pea starch, dry products consisting of potato starch were prepared in the same manner as in Example 2. To improve their quality these control products, were subjected to a conditioning treatment (re-drying step) of different intensity after the roll-drying step. The sensory qualities and cooking residue values of the dry products of the invention and of the control products are shown in Table I below:

TABLE I

| Dry Product | Cooking Residue (grams) After 10 Minutes Cooking Time | Organoleptic Evaluation |
| --- | --- | --- |
| Example 2 Invention | 100 | Good pulpy texture resembling "concassee" |
| Control (Flakes prepared with potato starch instead of smooth pea starch but process analogous to that used in Example 2) | 1-55 (maximum)* | Even with maximum cooking residue, product contained at best a pap-like structure |

*The maximum value is obtained by optimizing conditioning at the end of the roll-drying step. The step is not required when using smooth pea starch.

It has been demonstrated, by sensory qualities, as well as by the measured values presented in Table I, that the product prepared from leguminous starch in accordance with the invention had a clearly superior pulpy texture compared with the control product prepared from potato starch.

EXAMPLE 3

Example 2 was repeated using a roll-dryer operating on the applicator roll principle instead of the pond principle. The use of this roll principle resulted in a thicker flake which had a positive effect on the mechanical stability of the flakes and the pulpy texture of the reconstituted product.

COMPARISON TEST 1

A "tomato sponge" was prepared from potato starch as described in Example 1 of German Pat. No. 2,938,596. This "tomato sponge" and the product of Example 2 were each cooked in water for 2 minutes at the same concentration of 15 grams of product to 500 milliliters of water.

As indicated in Table II hereinbelow, after the products were each cooked for 2 minutes, both showed a comparable pulpy texture which resembled a "concassee".

TABLE II

| Dry Product | Cooking Residue (grams) After 2 Minutes Cooking Time | Sediment % | Organoleptic Evaluation |
| --- | --- | --- | --- |
| Comparison Test 1 Prepared according to German Patent No. 2,938,596 | 120 | 62 | Very good texture resembling a "concassee" |
| Example 2 Invention | 120 | 56 | Comparable pulpy texture |

The two products in Table II were also similar with respect to water-absorptive capacity which is based upon sediment percentages.

The differences between the two products in Table II became evident, however, after prolonged cooking. It was observed that the product prepared from Comparison Test 1 lost its coarse, pulpy texture more rapidly than the product prepared by the invention as in Example 2.

Significant differences were also observed in cold-swelling properties, as indicated in Table III below:

TABLE III

| Dry Product | Cold Residue (grams) | Organoleptic Evaluation |
| --- | --- | --- |
| Comparison Test 1 Prepared | 70 | Deposition of partially hydrated discrete |

TABLE III-continued

| Dry Product | Cold Residue (grams) | Organoleptic Evaluation |
|---|---|---|
| according to German Patent No. 2,938,596 | | particles |
| Example 2 Invention | 136 | Homogeneous pulpy product |

The dry product of the invention exhibited a superior rehydration behavior in cold water compared to the compound starch sponge product prepared according to German Pat. No. 2,938,596 (Comparison Test 1)

COMPARISON TEST 2

To demonstrate the difference between the product of the invention and the product prepared according to U.S. Pat. No. 3,650,770, Example 2 was repeated using high amylose corn starch instead of smooth pea starch. For this purpose a mixture consisting of 1.5 kilograms of high amylose corn starch (50% amylose), 4.1 kilograms of tomato pulp (36° Brix corresponding to 1.476 kilograms dry substance), 2.2 kilograms of water and 50 grams of citric acid was roll-dried and crushed as described in Example 1.

The resulting dry product was prepared by cooking at a concentration of 20 grams of product to 500 milliliters of water. The product obtained consisted of flakes in virtually clear serum which resembled protein coagulates. Due to its inability to retain water, this product also exhibited a lower sediment content than that prepared from smooth pea starch (compare with Table IV below).

TABLE IV

| Dry Product | Cooking Residue (grams) After 2 Minutes Cooking Time | Sediment % |
|---|---|---|
| Comparison Test 2 Prepared according to U.S. Pat. No. 3,650,770 | 80 | 27 |
| Example 2 Invention | 120 | 56 |

The measured values listed in Table IV clearly show that the use of high amylose corn starch disclosed in U.S. Pat. No. 3,650,770 to produce pulpy products, (a starch having an amylose content greater than 50%), does not produce a product with the desirable texture qualities of the instant invention.

COMPARISON TEST 3

Example 2 was repeated using a mixture of 1.2 kilograms of high amylose corn starch (50% amylose), 0.3 kilograms of potato starch (in place of the smooth pea starch in Example 2) and 1.5 kilograms of water. Comparison Test 3 was run to determine whether by reducing the amylose content of the product obtained from U.S. Pat. No. 3,650,770 (Comparison Test 2), the properties of the resulting starch product in Comparison Test 3 would be improved. Comparison tests would determine whether the desirable texture qualities of the product of the invention resulted from the type of starch used (smooth pea starch) or the amylose content of the product.

The results of Comparison Test 3, when compared to Example 2 (see Table V hereinbelow) indicate that even when the amylose content was reduced to about 40% (by the addition of potato starch) th quality of the high amylose corn starch product disclosed in U.S. Pat. No. 3,650,770 was not improved. It has been demonstrated that the desired properties of the product of the invention can only be obtained by the use of leguminous starches in accordance with the invention.

TABLE V

| Dry Product | Cooking Residue (grams) After 2 Minutes Cooking Time | Sediment % |
|---|---|---|
| Comparison Test 3 U.S. Pat. No. 3,650,770 | 85 | 33 |
| Example 2 Invention | 120 | 56 |

The following examples further illustrate the invention:

EXAMPLE 4

1 kilogram of fresh mushrooms were mashed, mixed with 1.6 kilograms of pea starch and then roll-dried under the conditions described in Example 1. 20 grams of the resulting flakes were rehydrated by the addition of 200 milliliters of hot water. A pulpy product having a characteristic mushroom flavor was obtained.

EXAMPLE 5

9 kilograms of leek were pre-cooked for about 10 minutes, mashed and mixed with 3.6kilo grams of pea starch. The resulting mass was roll-dried under the conditions described in Example 1. 20 grams of the product were rehydrated by the addition of 200 milliliters of hot water. A pulpy product having a characteristic leek flavor was obtained.

EXAMPLE 6

10 kilograms of frozen spinach were thawed and admixed with 1 kilogram of pea starch and 600 grams of a commercial bouillon mass. The resulting mass was roll-dried under the conditions described in Example 1. 20 grams of the resulting flakes were rehydrated by the addition of 200 milliliters of water. The product was quickly heated. A product having a consistency, appearance and flavor resembling that of freshly cooked spinach was obtained.

EXAMPLE 7

10 kilograms of frozen, strained raspberry mush was thawed and admixed with 1.1 kilograms of pea starch. The resulting mass was roll-dried under the conditions described in Example 1. 20 grams of the resulting flakes were rehydrated by the addition of 200 milliliters of water containing 20 grams of sugar. Boiling water was added to the flakes to obtain a pulpy, homogeneous, pleasant tasting fruit sauce. Additional boiling was not necessary. When boiled, the pulpiness of the product was gradually reduced. The water can also be replaced by milk to result in a product resembling a porridge prepared from oat flakes.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed:

1. An organoleptically improved dry food product which is reconstitutable with cold or hot aqueous liquids to form a flavored pulpy textured sauce, soup, juice, compote or concassee consisting essentially of:
   (a) a starch consisting at least partially of cold-swelling leguminous pregelatinized starch, and
   (b) at least one dried food flavoring agent selected from the group consisting of fruit, vegetable, fungus or root substance, wherein said flavoring agent gives the dry food product its dominant food flavor, and wherein said cold swelling leguminous pregelatinized starch is prepared by roll drying an aqueous dispersion of granular starch and conditioned by further heat treatment after drying.

2. The dry food product of claim 1, wherein said starch comprises at least about 50 to 85% by weight of leguminous pregelatinized starch.

3. The dry food product of claim 2, wherein said starch is comminuted to a particle size of about 0.1 to 10 mm.

4. The dry food product of claim 1, wherein said flavoring agent is selected from the group consisting of tomato, apple, orange, pear, apricot, raspberry, blackberry, red currant, carrot, horseradish, mushroom, celery root, leek, cauliflower or spinach.

5. The dry food product of claim 1, wherein said leguminous pregelatinized starch has a maximum amylose content of 50% by weight.

6. The dry food product of claim 1, wherein said leguminous pregelatinized starch is derived from the group consisting of *Phaseolus vulgaris, Phaseolus mungo* (radiatus, *Vigna radiata*), *Phaseolus crysantus, Phaseolus aconitifolius, Phaseolus lunatis, Dolichos lablab, Dolichos biflorus, Vicia faba* L, *Psophocarpus tetragonolobus, Cicer arietum, Cajanus cajan, Vigna unguiculata* (sinensis), *Pisum savitum* L or *Lens culinaris*.

7. The dry food product of claim 1, wherein the total content of starch is from about 2 to 70% based upon total weight.

8. The dry food product of claim 2, wherein the total content of starch isfrom about 3.5 to 50% based upon total weight.

9. The dry food product of claim 8, wherein the total content of starch is from about 5 to 25% based upon total weight.

10. The dry food product of claim 1, wherein a portion of the leguminous pregelatinized starch contained therein is charged with a fruit substance which is sorptively bound and incorporated in the starch matrix to form a compound leguminous pregelatinized starch.

11. The dry food product of claim 10, wherein at least 5 to 50% by weight of said fruit substance is present in the form of a compound leguminous pregelatinized starch.

12. The dry food product of claim 11, wherein said compound leguminous pregelatinized starch comprises about 10 to 95% by weight of starch.

13. The dry food product of claim 12, wherein said leguminous pregelatinized starch comprises about 25 to 80% by weight of starch.

14. The dry food product of claim 13, wherein said compound leguminous pregelatinized starch comprises about 35 to 65% by weight of starch.

15. A process for improving the organoleptic properties of a dry food product which is reconstitutable with cold or hot aqueous liquids to form a flavored pulpy textured sauce, soup, juice, compote or concassee consisting essentially of the steps of:
   (a) producing a pregelatinized starch by roll drying an aqueous dispersion of granular starch which consists at least in part of leguminous starch to obtain a dried film of said starch,
   (b) conditioning said pregelatinized starch by further heat treatment after drying to improve its reconstituting properties,
   (c) comminuting said starch to a particle size of about 0.1-10 mm., and
   (d) mixing said starch with at least one flavoring agent selected from the group consisting of a dry fruit, vegetable, fungus or root substance, wherein said flavoring agent gives the dry food product its dominant flavor.

16. The process of claim 15, wherein said leguminous pregelatinized starch is derived from the group consisting of *Phaseolus vulgaris, Phaseolus mungo* (radiatus, *Vigna radiate*), *Phaseolus crysantus, Phaseolus aconitifolius, Phaseolus lunatis, Dolichos lablab, Dolichos biflorus, Vicia faba* L, *Psophocarpus tetragonolobus, Cicer arietum, Cajanus cajan, Vigna unguiculata* (sinensis), *Pisum savitum* L or *Lens culinaris*.

17. The process of claim 15, wherein said leguminous pregelatinized starch comprises about 10 to 95% by weight of starch.

18. The process of claim 15, wherein said leguminous pregelatinized starch has a maximum amylose content of about 50% by weight.

19. The process of claim 15, wherein the flavoring agent is a fruit substance sorptively bound and incorporated in a starch matrix to form a compound leguminous pregelatinized starch wherein at least about 5 to 50% by weight of said fruit substance is present in the form of the compound leguminous pregelatinized starch.

20. The process of claim 15, wherein said flavoring agent is selected from the group consisting of tomato, apple, orange, pear, apricot, raspberry, blackberry, red currant, carrot, horseradish, mushroom, celery root, leek, cauliflower or spinach.

* * * * *